US012011661B1

(12) United States Patent
Liu et al.

(10) Patent No.: US 12,011,661 B1
(45) Date of Patent: Jun. 18, 2024

(54) GAME LIGHTING-EFFECT CONTROL METHOD, DEVICE, EQUIPMENT, AND STORAGE MEDIUM

(71) Applicants: Shenzhen Intellirocks Tech. Co., Ltd., Shenzhen (CN); Shenzhen Qianyan Technology LTD, Shenzhen (CN)

(72) Inventors: Shijie Liu, Shenzhen (CN); Jie You, Shenzhen (CN); Wenlong Wu, Shenzhen (CN)

(73) Assignees: Shenzhen Intellirocks Tech. Co., Ltd., Shenzhen (CN); Shenzhen Qianyan Technology Ltd., Shenzhen (CN)

( * ) Notice: Subject to any disclaimer, the term of this patent is extended or adjusted under 35 U.S.C. 154(b) by 0 days.

(21) Appl. No.: 18/473,225

(22) Filed: Sep. 23, 2023

(30) Foreign Application Priority Data

Apr. 12, 2023 (CN) .......................... 202310385556.6

(51) Int. Cl.
*A63F 13/52* (2014.01)
*A63F 13/537* (2014.01)
(Continued)

(52) U.S. Cl.
CPC ............ *A63F 13/52* (2014.09); *A63F 13/537* (2014.09); *G06T 7/00* (2013.01); *G06T 7/20* (2013.01);
(Continued)

(58) Field of Classification Search
CPC ........ A63F 13/215; A63F 13/28; A63F 13/50; A63F 13/52; A63F 13/26; A63F 13/424;
(Continued)

(56) References Cited

U.S. PATENT DOCUMENTS

| 8,052,305 B2 * | 11/2011 | Hsiao | H05B 47/12 |
| | | | 362/802 |
| 8,411,029 B2 * | 4/2013 | Casparian | A63F 13/24 |
| | | | 463/36 |

(Continued)

FOREIGN PATENT DOCUMENTS

| CN | 109999496 A | 7/2019 |
| CN | 115776750 A | 3/2023 |

*Primary Examiner* — William H McCulloch, Jr.
(74) *Attorney, Agent, or Firm* — KIP Legal Services

(57) ABSTRACT

A game lighting-effect control method includes: acquiring each game screen image presented in a continuous timing sequence, and performing target detection on game action icons in each game screen image to determine that a game-action icon is in a triggered state, wherein the game action icons include game skill icons, the game skill icons have frame content; identifying the frame content corresponding to the game action icon in the triggered state based on a preset game-action recognition model, the frame content representing game actions corresponding to each game character; determining a corresponding lighting effect type based on a color-change recognition result of the frame content corresponding to the game action icon; and generating a corresponding lighting-effect control instruction based on the lighting effect type, and inputting the lighting-effect control instruction to a lighting-effect control circuit to display game lighting-effect corresponding to the lighting effect type.

19 Claims, 6 Drawing Sheets

(51) Int. Cl.
  *G06T 7/00* (2017.01)
  *G06T 7/20* (2017.01)
  *H05B 45/20* (2020.01)
  *H05B 47/105* (2020.01)
  *H05B 47/165* (2020.01)

(52) U.S. Cl.
  CPC ........... *H05B 45/20* (2020.01); *H05B 47/105* (2020.01); *H05B 47/165* (2020.01)

(58) Field of Classification Search
  CPC ..... A63F 13/537; A63F 13/54; G09G 3/2003; G09G 3/32; G06V 20/41; G06V 20/49; H05B 47/105; H05B 47/165; H05B 45/20; G06T 7/00; G06T 7/20
  See application file for complete search history.

(56) References Cited

U.S. PATENT DOCUMENTS

| | | | | |
|---|---|---|---|---|
| 9,272,215 B2* | 3/2016 | Casparian | ................ | G06F 1/26 |
| 9,763,021 B1* | 9/2017 | Peeler | ................ | H05B 47/105 |
| 9,788,042 B2* | 10/2017 | Ro | ................ | H04N 21/84 |
| 10,170,089 B2* | 1/2019 | Shi | ................ | G10H 1/0016 |
| 10,569,175 B2* | 2/2020 | Kosai | ................ | G07F 17/32 |
| 10,708,535 B2* | 7/2020 | Abe | ................ | H04N 5/57 |
| 11,210,911 B2* | 12/2021 | Murphy | ................ | G06F 3/165 |
| 11,324,093 B1* | 5/2022 | Pruitt | ................ | H05B 47/155 |
| 11,737,192 B2* | 8/2023 | You | ................ | H05B 47/155 315/307 |
| 11,833,418 B2* | 12/2023 | Bryan | ................ | A63F 13/837 |
| 11,871,494 B1* | 1/2024 | Huang | ................ | H05B 47/155 |
| 11,889,605 B1* | 1/2024 | Zhu | ................ | H05B 47/175 |
| 2009/0268448 A1* | 10/2009 | Hsiao | ................ | H05B 45/20 362/253 |
| 2016/0066011 A1* | 3/2016 | Ro | ................ | H04M 1/72415 725/38 |
| 2016/0073191 A1* | 3/2016 | Kettering | ................ | H05B 45/30 381/74 |
| 2016/0117793 A1* | 4/2016 | Sierra | ................ | G06F 3/1438 345/502 |
| 2018/0174560 A1* | 6/2018 | Shi | ................ | H05B 47/115 |
| 2019/0199958 A1* | 6/2019 | Abe | ................ | H04R 1/028 |
| 2020/0286345 A1* | 9/2020 | Murphy | ................ | A63F 13/215 |
| 2021/0096656 A1* | 4/2021 | Gilg | ................ | A63F 13/285 |
| 2021/0236931 A1* | 8/2021 | Cox | ................ | A63F 13/5375 |
| 2021/0339132 A1* | 11/2021 | Shakespeare | ................ | A63F 13/537 |
| 2022/0108592 A1* | 4/2022 | Murphy | ................ | H05B 47/12 |
| 2022/0353435 A1* | 11/2022 | Cohen-Tidhar | ................ | G06T 7/246 |
| 2022/0362663 A1* | 11/2022 | Bryan | ................ | A63F 13/54 |
| 2023/0217570 A1* | 7/2023 | You | ................ | H05B 47/165 315/307 |
| 2023/0319120 A1* | 10/2023 | Doken | ................ | H04L 65/1089 348/14.02 |

\* cited by examiner

GAME LIGHTING-EFFECT CONTROL METHOD, DEVICE, EQUIPMENT, AND STORAGE MEDIUM

CROSS-REFERENCES TO RELATED APPLICATIONS

This application claims priority to Chinese Patent Application No. CN202310385556.6, filed on Apr. 12, 2023, the content of which is hereby incorporated by reference in entirety.

FIELD OF THE TECHNOLOGY

The present disclosure relates to the technical field of lighting equipment control and, in particular, to a game lighting-effect control method, device, equipment, and storage medium.

BACKGROUND OF THE DISCLOSURE

With the improvement of people's quality of life, there comes higher standard for material life, smart homes have developed rapidly, and more and more people have begun to use smart homes. As lighting equipment is an important part of smart homes, people's requirements for the lighting equipment can no longer be satisfied with the simple lighting function.

Currently, by detecting the game application program running on the electronic device, and obtaining the game user's mouse, keyboard, game handle and other operation information, the lighting effect of the lamps on the e-sports display can be determined according to the game user's operation information. As the operation information reflects information such as the game state and the user's actual actions in the game, determining the lighting effect according to the operation information can make the lighting effect adapt to the real-time game state, creating a better game atmosphere.

For existing technology of lighting effect control and display, it often takes up a lot of computer space, thereby impacting various performance indicators of the game terminal. At the same time, the frame rate for capturing operation information such as the mouse, keyboard, and game handle is also relatively low, it often cannot ensure that the lighting effect matches the content of the game screen to be displayed in real time. The lighting effect has a high delay, which leads to mundane control and display effect of the game lighting-effect, and the compatibility of the game lighting-effect is poor. Further, it often can only be compatible with PC game consoles, and cannot be compatible with various game terminals such as PS5 and Switch, and the lighting effect controlled and displayed by such traditional technology is monotonous, and does not have the effect of adaptively controlling the lighting effect according to the content of the game screen, and the user experience in lighting effect feedback is poor, and cannot enrich user experience.

The disclosed methods and apparatus are directed to solve one or more problems set forth above and other problems.

SUMMARY

According to another aspect of the present disclosure, a game lighting-effect control method is provided. The game lighting-effect control method includes: acquiring each game screen image presented in a continuous timing sequence, and performing target detection on game action icons in each game screen image to determine that a game-action icon is in a triggered state, wherein the game action icons include game skill icons, the game skill icons have frame content, the frame content is different for different game characters and presents different colors corresponding to different skill actions of a selected game character, and the skill actions are released individually or in combination through a button; identifying the frame content corresponding to the game action icon in the triggered state based on a preset game-action recognition model, the frame content representing game actions corresponding to each game character; determining a corresponding lighting effect type based on a color-change recognition result of the frame content corresponding to the game action icon; and generating a corresponding lighting-effect control instruction based on the lighting effect type, and inputting the lighting-effect control instruction to a lighting-effect control circuit in a lighting device to display game lighting-effect corresponding to the lighting effect type.

According to another aspect of the present disclosure, a game lighting-effect control device is provided. The game lighting-effect control device includes a control unit, and a lighting device. The lighting device has a built-in lighting-effect control circuit, and the control unit is used to run a computer program product and, when the computer program product is running, execute a game lighting-effect control method. The method includes: acquiring each game screen image presented in a continuous timing sequence, and performing target detection on game action icons in each game screen image to determine that a game-action icon is in a triggered state, wherein the game action icons include game skill icons, the game skill icons have frame content, the frame content is different for different game characters and presents different colors corresponding to different skill actions of a selected game character, and the skill actions are released individually or in combination through a button; identifying the frame content corresponding to the game action icon in the triggered state based on a preset game-action recognition model, the frame content representing game actions corresponding to each game character; determining a corresponding lighting effect type based on a color-change recognition result of the frame content corresponding to the game action icon; and generating a corresponding lighting-effect control instruction based on the lighting effect type, and inputting the lighting-effect control instruction to a lighting-effect control circuit in a lighting device to display game lighting-effect corresponding to the lighting effect type.

According to another aspect of the present disclosure, a computer-readable storage medium is provided. The computer-readable storage medium stores a computer program in the form of computer-readable instructions for, when the computer program is run by a computer, performing a game lighting-effect control method. The method includes: acquiring each game screen image presented in a continuous timing sequence, and performing target detection on game action icons in each game screen image to determine that a game-action icon is in a triggered state, wherein the game action icons include game skill icons, the game skill icons have frame content, the frame content is different for different game characters and presents different colors corresponding to different skill actions of a selected game character, and the skill actions are released individually or in combination through a button; identifying the frame content corresponding to the game action icon in the triggered state based on a preset game-action recognition model, the frame content representing game actions corresponding to each game character; determining a corresponding lighting effect type based on a color-change recognition result of the frame content corresponding to the game action icon; and generating a corresponding lighting-effect control instruction based on the lighting effect type, and inputting the lighting-effect control instruction to a lighting-effect control circuit in a lighting device to display game lighting-effect corresponding to the lighting effect type.

The present disclosure is to solve certain problems of existing technology, such as the lighting effect controlled and displayed being monotonous, and not having the effect of adaptively controlling the lighting effect according to the content of the game screen, the user experience in lighting effect feedback being poor, and not being able to enrich user experience, etc. According to the present disclosure, it can perform a target detection on the game skill icons in each game screen image to determine the state category of the game skill icons and, after and on the basis of determining the state category of the game skill icons, identify the frame content corresponding to the game skill icons based on the character skill recognition model, without occupying the use space and various performance indicators of the game terminal. It can effectively identify the content of the game screen image in real time, so that the lighting effect can be displayed in real time matching the content of the game screen image, ensuring the real-time and low time latency of the lighting effect. Based on the color-capturing algorithm to extract the colors corresponding to the content of the picture frame in the game skill icon to obtain various color combinations, it can determine the corresponding lighting effects according to the various color combinations, and determine the corresponding lighting effects based on the various color combinations corresponding to the specific game skills and actions of various game characters in the game, greatly enriching the control and display of lighting effects. It can adjust the lighting effects in time according to the real-time changes of game skill actions, and adapt the lighting effects to match real-time game skill actions and corresponding skill types, bringing the user a unique interactive experience of game lighting-effects, which greatly enriches the user's e-sports visual senses, and enhances the user's gaming experience.

Other aspects of the present disclosure can be understood by those skilled in the art in light of the description, the claims, and the drawings of the present disclosure.

BRIEF DESCRIPTION OF THE DRAWINGS

To describe the technical solutions of the embodiments of the present disclosure more clearly, the following briefly introduces the accompanying drawings used for describing the disclosed embodiments. Apparently, the accompanying drawings in the following description show merely some embodiments of the present disclosure, and a person of ordinary skill in the technology may derive other drawings from these accompanying drawings without creative efforts.

DETAILED DESCRIPTION

The following describes exemplary embodiments in detail, and examples of the embodiments are shown in the accompanying drawings, so as to better understand the present disclosure. Unless otherwise specified, a same number in different drawings may represent a same or similar element. The implementations described in the disclosed embodiments below do not represent all implementations consistent with the present disclosure, but are merely examples of the apparatus and the methods that are consistent with some aspects of the present disclosure, and should not be used for limiting the present disclosure. Further, as long as there is no conflict, the embodiments of the present disclosure and features of the embodiments may be combined with each other.

Those skilled in the art will understand that unless otherwise stated, the singular forms "a", "an", "said" and "the" used herein may also include plural forms. It should be further understood that the word "comprising" used in the description of the present disclosure refers to the presence of said features, integers, steps, operations, elements and/or components, but does not exclude the presence or addition of one or more other features, integers, steps, operations, elements and/or components, but does not preclude the presence or addition of one or more other features, integers, steps, operations, elements, components and/or groups thereof. It will be understood that when an element is referred to as being "connected" or "coupled" to another element, it can be directly connected or coupled to the other element or intervening elements may also be present. Additionally, "connected" or "coupled" as used herein may include wireless connection or wireless coupling. The expression "and/or" used herein includes all or any elements and all combinations of one or more associated listed items.

Those skilled in the art can understand that, unless otherwise defined, all terms (including technical terms and scientific terms) used herein have the same meaning as commonly understood by those of ordinary skill in the art to which this invention belongs.

Figure 1:
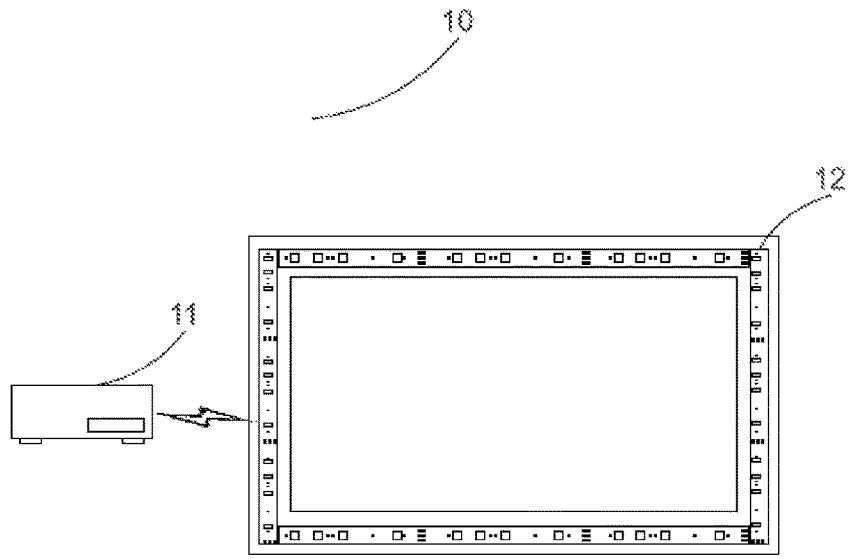
FIG. 1 illustrates a schematic circuit diagram of a game lighting-effect control device according to an embodiment of the present disclosure.

Referring to FIG. 1, the game lighting-effect control method described in the present disclosure can be implemented based on the game lighting-effect control device 10. The game lighting-effect control device 10 includes a control unit 11 and a lighting device 12, etc. The control unit 11 and the lighting device 12 can be connected to a network, and the network can be one or more of the Internet, a local area network (LAN), a metropolitan area network (MAN), a wide area network (WAN), a mobile, wired, or wireless network, a private network, and a virtual private network. The network may also include network entities such as routers and gateways.

In some embodiments, the communication between the control unit 11 and the lighting device 12 can be carried out through a specific communication protocol, and the communication protocol may include BLE (Bluetooth low energy) protocol, WLAN (wireless local area network) protocol, Bluetooth protocol, ZigBee protocol, or Wi Fi (wireless fidelity) protocol, etc.

In some embodiments, the control unit 11 includes a hardware interface, and the control unit 11 can be connected with an XBOX (home video game console), a PS (PlayStation), or other devices through the hardware interface to obtain game screen images from the original video stream presented in a continuous timing sequence. The hardware interface can be VGA (Video Graphics Array), DP (DisplayPort), HDMI (High Definition Multimedia Interface) or DVI (Digital Visual Interface), etc.

In some embodiments, based on actual needs, the control unit 11 can be implemented as one or more SOC (system-on-chip), CPU (central processing unit), and/or MPU (micro control unit), etc., which is not intended to be limiting.

In some embodiments, the lighting device 12 may be a strip lamp, a string lamp, a cylinder lamp, or a plane lamp (containing a plurality of lamp beads), etc., and the lighting device 12 may include one or more lighting units, and each lighting unit can contain one or more lamp beads. The control unit 11 can control the brightness, color, etc., of the lamp beads of the lighting unit, and can also control the number of lighting units to be turned on, so as to achieve different lighting effects of the lighting device 12. Those skilled in the art can set the positions and quantity of the lighting devices 12 according to actual needs.

Figure 2:
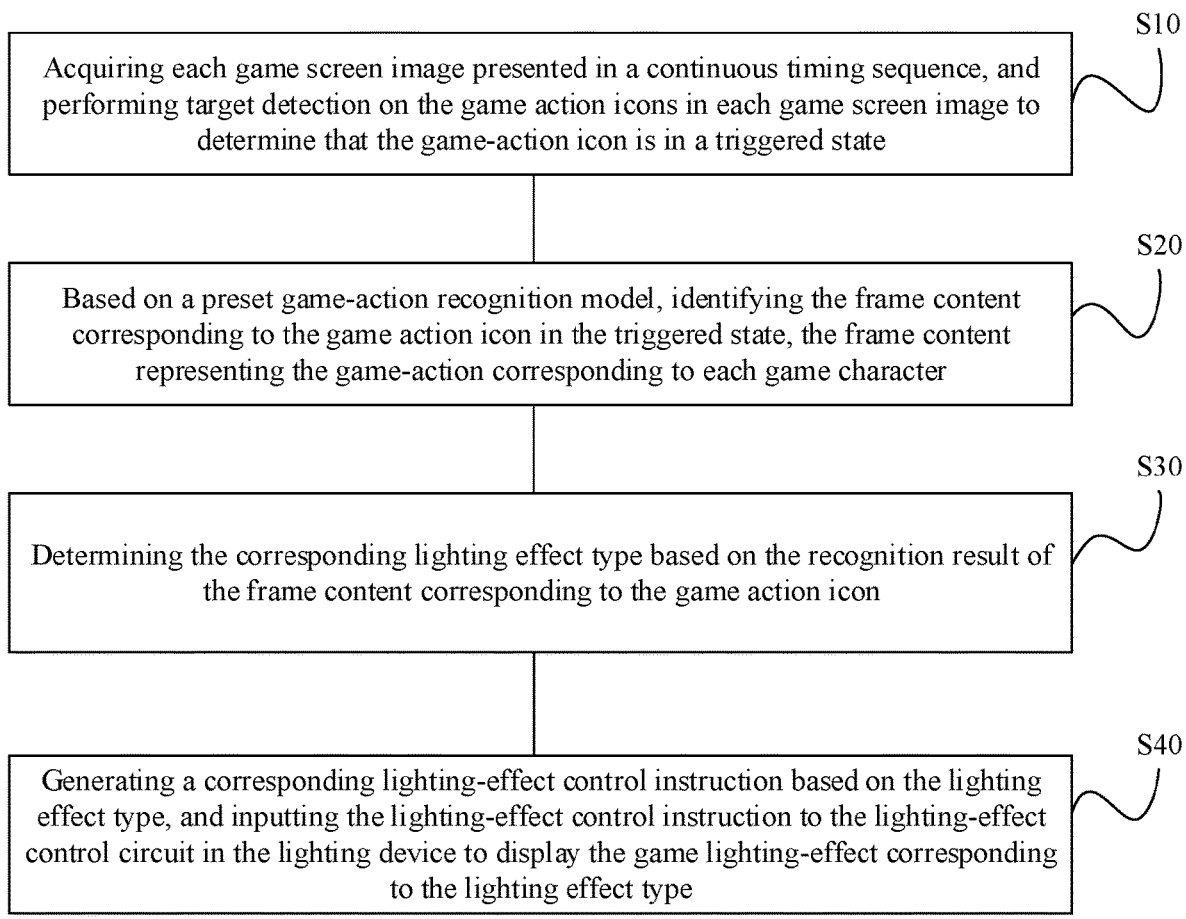
FIG. 2 illustrates a schematic flowchart of a game lighting-effect control method according to an embodiment of the present disclosure.

Based on the above illustrative usage scenes, in one embodiment, referring to FIG. 2, the game lighting-effect control method of the present disclosure may include the following.

S10, acquiring each game screen image presented in a continuous timing sequence, and performing target detection on the game action icons in each game screen image to determine that the game-action icon is in a triggered state.

The screen images that need to be controlled by the technical solutions of the present disclosure can be regarded as the game screen images of the present disclosure. The types and sources of game screen images described in the present disclosure are not limited herein and can be determined according to actual application scenarios. The game action icons includes icons representing game skills and game floating icons, and the game screen image can be any one of a game screen image rendered in real time in a game application program, a game screen image in a live webcast, or a game screen image in a video. The control unit can be connected to the display device through a hardware interface, so as to realize access to each game screen image presented in the continuous timing sequence in the display device. After the control unit acquires each game screen image presented in the continuous timing sequence, the control unit can divide the game screen images into at least two sequences of game screen images. The looping out of each game screen image presented in the continuous timing sequence can be realized by calling a video capture card. One sequence of the game screen images are sent to the display device, so that the display device displays the game according to the sequence of game screen images. The other sequence of game screen images are converted a image format that can be received by the multimedia processing chip in the control unit. The multimedia processing chip can be a SOC (system-on-chip) chip or an NPU (neural-network processing unit, embedded neural network processor) chip, etc. After formatting the game screen images, the control unit can perform the target detection on the game skill icons in each game screen image to determine that the game skill icon is in a triggered state.

In one embodiment, the control unit may also duplicate the acquired game screen images to generate the at least two sequences of game screen images.

In some embodiments, on the basis of the existing structure of the lighting effect control device, a camera unit can be included or connected to the control unit. The camera unit can capture or record the game screen images being displayed on the display device to generate the sequence of corresponding game screen images, and the control unit acquires the recorded game screen images.

In some embodiments, the MOBA game is used as an example, without limiting the present disclosure. The MOBA game is a multiplayer online tactical arena game. For the fixed skill column in the MOBA game, the fixed skill column includes various game skill icons of a selected game character, such as: Q skill, W skill, E skill, R skill, D skill or F skill. That is, different game characters have different skill actions, and the fixed skill column for different game characters may have different content or different game skill icons. The game player can trigger the game skill icons individually or in combination to release the skill action of the selected game character.

In some embodiments, game players have battle communication information during game operations, and can actively send different types of information prompts based on the game floating icon, and detect the game floating icon through a target detection model to determine the type of the game floating icon triggered by the player in the game. According to the different types of the game floating icons triggered, such as information prompts of danger, retreat, and attack, the control unit may trigger the preset game lighting-effect corresponding to the game floating icon, and use the content need to be displayed according to the game floating icon to generate a lighting preset template, matching the game floating icon with the lighting action(s) to display the lighting effect through a series of parameters such as color, brightness, speed, and duration, etc. The lighting effect may include a series of effects such as breathing, flickering, rolling, gradual displacement, and gradual flow, etc., and preset colors may be associated with the types of game floating icons. The light effects corresponding to the scene and feature changes in every game can be matched with the game floating icon to complete the display of lighting effects.

Specifically, the user or player performs the corresponding skill operation on the selected game character in the MOBA game scene, and can click the corresponding button of Q skill, W skill, E skill, R skill, D skill or F skill through the keyboard or gamepad, to trigger the game skill icon corresponding to Q skill, W skill, E skill, R skill, D skill or F skill, etc. The Q skill, W skill, E skill, R skill, D skill or F skill represent the game skill corresponding to the game character selected by the player. After triggering the game skill icon corresponding to the selected game character, the control unit performs a target detection on the game skill icon based on a target detection model, so as to determine that the game skill icon is in the triggered state and also the corresponding screen or frame position. The individual or combined skill action corresponding to the game skill icon is generated on the game screen image to release, attack, or kill the game character selected by the opponent's game player or team.

S20, based on a preset game-action recognition model, identifying the frame content corresponding to the game action icon in the triggered state, the frame content representing the game-action corresponding to each game character.

The game action recognition model includes a character skill recognition model, and the character skill recognition model can be implemented based on an image feature extractor followed by a classifier.

When the character skill recognition model is trained, game screen images with game skill icons in the triggered state can be collected in advance as sample images, each training sample is correspondingly labeled with sample labels, and skill action corresponding to the game skill icon in the triggered state of the training sample and the skill type corresponding to the skill action are labeled. After completing the labeling of each training sample, each training sample and its supervision label can be mapped to construct a training set, and sample images in the sample data set and the sample labels are inputted. The sample label represents the skill action corresponding to the game skill icon in the triggered state and the skill type corresponding to the skill action.

The image feature extractor extracts deep semantic information of the game screen image. The deep semantic information is classified and mapped to obtain a corresponding classification result and to determine whether the result represents the skill action corresponding to the game skill icon in the triggered state and the skill type corresponding to the skill action. The classification loss value of the classification result according to the sample label is calculated. When the loss value indicates that the character skill model has not converged, and the character skill model is updated in gradient, it continues to call the next training sample and sample label in the training set to perform iterative training on the model until the model is trained to a converged state. After iterative training converges, the model can predict and represent the frame content corresponding to the game skill icon in the triggered state, that is, the game skill action and skill type corresponding to the game skill icon in the triggered state are identified.

It is not difficult to understand that, to perform character skill recognition on the game skill icon in the triggered state, first the game screen image of the game skill icon in the triggered state is obtained, and the game screen image is inputted into the trained character skill recognition model, thereby obtaining the game skill action and skill type corresponding to the game skill icon in the triggered state.

In some embodiments, the game player uses a keyboard or a gamepad to release skill actions individually or in combination with corresponding keys such as Q skill, W skill, E skill, R skill, D skill or F skill of the selected game character, and the single or combined game skill actions are rendered on the game screen image. The game skill icon corresponding to the selected game character is in the triggered state, and the frame content corresponding to the game skill icon in the triggered state is identified based on the preset character skill recognition model. That is, the game skill action and skill type corresponding to the game skill icon in the triggered state are identified, and the frame content represents the game skill action corresponding to each game character.

S30, determining the corresponding lighting effect type based on the recognition result of the frame content corresponding to the game action icon.

Because the content of the game skill icons of different game characters is different, when the game skill icon of the selected game character is triggered, the color rendered by the skill action and skill type corresponding to the game skill icon change accordingly. The color change of the game skill icon in the triggered state thus has the characteristics of the game character, and the corresponding lighting effect type can be determined in real time according to the color change of the game skill icon in the triggered state, and the corresponding lighting effect of the game skill icon is presented, so that the lighting effects matched with the content of the game screen image can be displayed in real time, significantly improving the user's gaming experience. That is, the recognition result of the frame content may be a color-change recognition result. After identifying the game skill action and skill type corresponding to the game skill icon in the triggered state, the control unit extracts the frame content corresponding to the game skill icon in the triggered state based on a color-capturing algorithm; extracts the corresponding image pixel data of the corresponding picture frame content; obtains the color blocks that account for a relatively larger amount of color data in the image pixel data; outputs the corresponding HSV (hue saturation and value) values of each of the color blocks; combines the corresponding HSV value of each color block to obtain various color combinations; and determines the corresponding lighting effect type based on the various color combinations.

In some embodiments, after the game player triggers the game skill icon corresponding to the selected game character, the game skill action and skill type corresponding to the game skill icon in the triggered state are recognized based on a preset character skill recognition model. Based on the color-capturing algorithm, the color rendered by the skill action and the skill type corresponding to the game skill icon in the triggered state is extracted, and the corresponding color value and color quantity is determined by performing the color capture on the color rendered by the skill action and the skill type corresponding to the game skill icon in the triggered state. The lighting effect types of various color combinations can be obtained based on the color value and color quantity.

S40, generating a corresponding lighting-effect control instruction based on the lighting effect type, and inputting the lighting-effect control instruction to the lighting-effect control circuit in the lighting device to display the game lighting-effect corresponding to the lighting effect type.

Based on the color-capturing algorithm, the control unit extracts the picture frame content corresponding to the game skill icon in the triggered state to determine various color combinations, determines the various color combinations as the lighting effect type, and generates the corresponding lighting-effect control instruction based on the lighting effect type. The control unit is connected to the lighting device, and the control unit outputs the lighting-effect control instruction to the lighting device, so that the lighting-effect control circuit of the lighting device can generate a corresponding lighting-effect control signal to control at least one light-emitting element in the lighting device to emit light correspondingly, presenting the lighting effect of corresponding to the lighting effect type. The light-emitting element may be a light-emitting element capable of emitting monochromatic light, or a light-emitting element capable of emitting RGB (red, green, blue) three-color light.

Specifically, the lighting-effect control instruction is outputted to the lighting device, so that the lighting-effect control circuit of the lighting device can generate a corresponding lighting-effect control signal. The pulse code information corresponding to the lighting-effect control instruction may be obtained first, and the pulse code information is used to represent a voltage-level type sequence corresponding to binary values, the voltage-level type can be a high voltage-level and a low voltage-level, etc., based on the binary value in the lighting-effect control instruction. The lighting-effect control signal can be generated according to the corresponding pulse code information.

It can be seen from the above embodiments, the present disclosure is to solve the problems such as the lighting effect controlled and displayed being monotonous, and not having the effect of adaptively controlling the lighting effect according to the content of the game screen, the user experience in lighting effect feedback being poor, and not being able to enrich user experience. According to the present disclosure, it can perform a target detection on the game skill icons in each game screen image to determine the state category of the game skill icons and, after and on the basis of determining the state category of the game skill icons, identify the frame content corresponding to the game skill icons based on the character skill recognition model, without occupying the use space and various performance indicators of the game terminal. It can effectively identify the content of the game screen image in real time, so that the lighting effect can be displayed in real time matching the content of the game screen image, ensuring the real-time and low time latency of the lighting effect. Based on the color-capturing algorithm to extract the colors corresponding to the content of the picture frame in the game skill icon to obtain various color combinations, it can determine the corresponding lighting effects according to the various color combinations, and determine the corresponding lighting effects based on the various color combinations corresponding to the specific game skills and actions of various game characters in the game, greatly enriching the control and display of lighting effects. It can adjust the lighting effects in time according to the real-time changes of game skill actions, and adapt the lighting effects to match real-time game skill actions and corresponding skill types, bringing the user a unique interactive experience of game lighting-effects, which greatly enriches the user's e-sports visual senses, and enhances the user's gaming experience.

Figure 3:
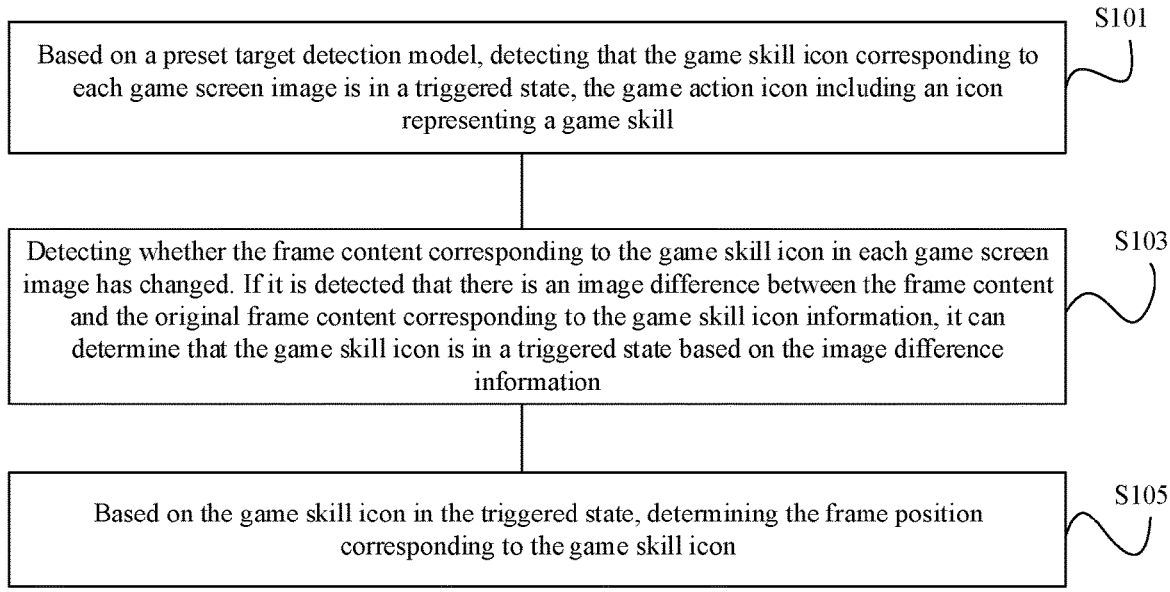
FIG. 3 illustrates a schematic flowchart diagram of performing target detection on game skill icons in each game screen image to determine that the game skill icon is in a triggered state according to an embodiment of the present disclosure.

On the basis of the embodiment of the present disclosure, referring to FIG. 3, the process of performing target detection on the game action icons in each game screen image to determine that the game action icons are in a triggered state includes the following.

S101, based on a preset target detection model, detecting that the game skill icon corresponding to each game screen image is in a triggered state, the game action icon including an icon representing a game skill.

The target detection of the game skill icons in each game screen image can be implemented based on the target detection model, and the target detection is implemented on each game screen image based on the target detection model to determine that the game skill icon in the current game screen image in each game screen image is in a triggered state and the corresponding frame position.

Specifically, game screen images with game skill icons can be pre-collected as training samples, correspondingly labeled with supervision labels for each training sample, and the position information of the game skill icons in the game screen images in the training samples and the state category corresponding to the game skill icons are labeled. After completing the labeling of each training sample, each training sample and its supervision labels can be mapped to construct a training set, and a single training sample and its supervision label in the training set can be obtained. The sample is inputted to the target detection model, and the image feature information of the area corresponding to the coordinate labeled by the corresponding supervision label in the game screen image of the training sample is extracted, and the image feature information is classified and mapped to a preset classification space representing multiple types of state corresponding to the game skill icon. The classification probability corresponding to each classification space is obtained, and the state category of the game skill icon represented by the classification space with the largest classification probability is determined. Using a loss function based on the position information of the game skill icon labeled by the supervision label and the state category of the game skill icon, the loss value corresponding to the state category of the game skill icon and the position information of the game skill icon represented by the classification space with the largest classification probability is calculated. When each loss value reaches a preset threshold, it indicates that the target detection model has been trained to a converged state, so that the model training can be terminated. Otherwise, it indicates that the model has not converged, and the model can be updated according to the gradient of each loss value, usually by correcting the weight parameters of each link of the model through backpropagation to make the model further approach convergence. Further, it continues to call the next training sample in the training set to perform iterative training on the model until the model is trained to a converged state. It is not difficult to understand that the target detection model trained to convergence can detect that the game skill icon in the current game screen image is in a triggered state and the corresponding frame position in the game screen image.

S103, detecting whether the frame content corresponding to the game skill icon in each game screen image has changed. If it is detected that there is an image difference between the frame content and the original frame content corresponding to the game skill icon information, it can determine that the game skill icon is in a triggered state based on the image difference information.

Detecting the state category of the game skill icon can detect whether the frame content corresponding to the game skill icon in each game screen image changes. When the game player triggers the game skill icon corresponding to the selected game character, the color rendered by the game skill icon corresponding to the skill action and the skill type will change accordingly with the release of the skill action. The color change of the game skill icon in the triggered state is characteristic of the game character. If there is image difference information between the frame content and the original frame content corresponding to the game skill icon, it is determined, based on the image difference information, that the game skill icon is in a triggered state.

S105, based on the game skill icon in the triggered state, determining the frame position corresponding to the game skill icon.

The target detection of the game skill icons in each game screen image can be implemented based on the target detection model, and the target detection model is used to perform target detection on the game skill icons in each game screen image, to determine that the game skill icon is in a triggered state. The target detection model can be selected from Yolo series models or SSD series models. Because online games have high requirements for real-time and low latency, and the Yolo model has the advantages of fast detection speed, etc., the present disclosure uses the Yolo model as an example, without limiting the present disclosure. To perform target detection on the game screen image, first it can obtain each game screen image presented in a continuous timing sequence, and input the current game screen image to a trained Yolo model to obtain the game skill icon in current game screen image in a triggered state and corresponding frame position. This type of model can perform corresponding target detection on the image, and obtain the position information of the image area where the detected target is located, for example: the frame position information corresponding to the game skill icon, where usually the frame position information is represented by a rectangular frame coordinate. For example, it is expressed as (x0, y0, x1, y1), where (x0, y0) represents the coordinates of the upper left corner of the rectangular frame, and (x1, y1) represents the coordinates of the lower right corner of the rectangular frame, so that the frame position corresponding to the above game skill icon can be determined.

As can be seen from the above-mentioned embodiments, based on the target detection of the game skill icons in each game screen image to determine the state category and frame position of the game skill icon, it can accurately detect in real time that the game skill icon corresponding to the game character selected by the game player is in the triggered state, without occupying the use space and various performance indicators of the game terminal, and can accurately respond to the lighting effect in real time to match the content of the game screen image, ensuring the real-time and low-latency of the lighting effect.

Figure 4:
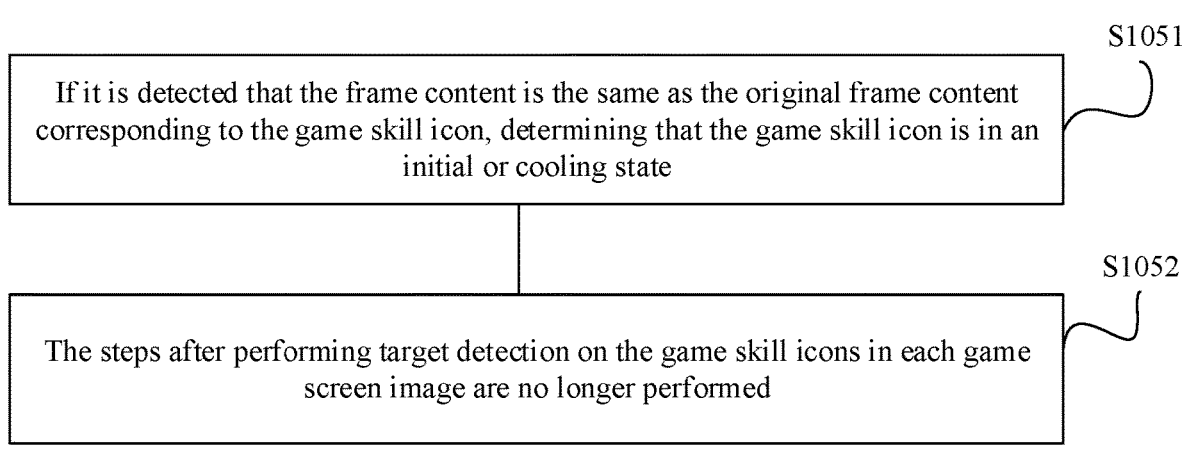
FIG. 4 illustrates a schematic flowchart diagram of performing target detection on game skill icons in each game screen image to determine whether the game skill icons are in an initial or cooling state according to an embodiment of the present disclosure.

On the basis of any embodiment of the present disclosure, referring to FIG. 4, after detecting whether the frame content corresponding to the game skill icon in each game screen image has changed, the following can also be included.

S1051, if it is detected that the frame content is the same as the original frame content corresponding to the game skill icon, determining that the game skill icon is in an initial or cooling state.

When the game skill icon corresponding to the game character selected by the game player is in the initial or cooling state, the color rendered by the game skill action and skill type corresponding to the game skill icon is the same as the frame content of the original frame corresponding to the game skill icon. When it is detected that the frame content is the same as that of the original picture frame corresponding to the game skill icon, it indicates that the game character selected by the game player has not released the corresponding skill action or the skill action has been released completely. If there is no corresponding change in the color rendered by the game skill action and skill type corresponding to the game skill icon, it is determined that the game skill icon is in the initial or cooling state, and no corresponding game lighting-effect is displayed.

S1053, the steps after performing target detection on the game skill icons in each game screen image are no longer performed.

In order to reduce unnecessary calculations, the steps after performing target detection on the game skill icons in each game screen image are no longer performed. It is not difficult to understand that, if the game skill icons are in the initial or cooling state, it indicates that the game character selected by the game player has not released the corresponding skill action or the skill action has been released completely, there is no need for further processing, and there is no need to display the corresponding game lighting-effect.

It can be seen from the above embodiments, the display of game lighting-effect is controlled based on the different state categories of game skill icons, and the lighting effects are adaptively matched with the user's real-time game skill actions to bring the user a unique interactive experience of game lighting-effects. When the skill icon is in the initial or cooling state, the corresponding game lighting-effects are not displayed to reduce unnecessary calculations.

Figure 5:
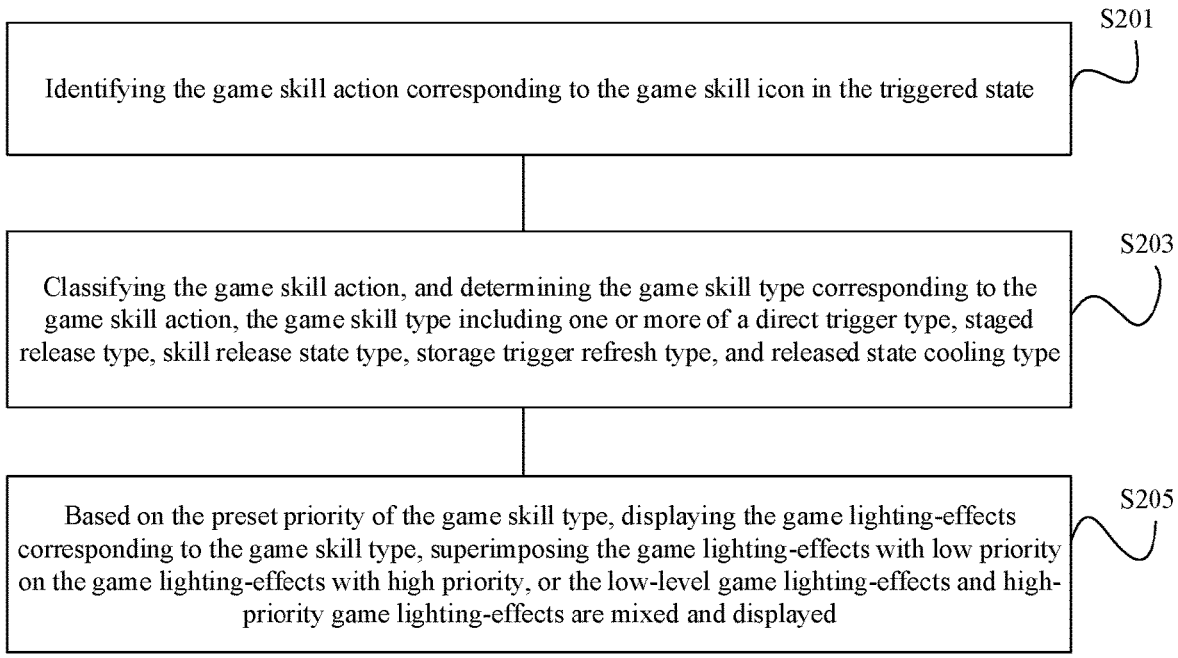
FIG. 5 illustrates a schematic flowchart diagram of displaying game lighting-effects corresponding to game skill types with different priorities according to an embodiment of the present disclosure.

On the basis of any embodiment of the present disclosure, referring to FIG. 5, after identifying the frame content corresponding to the game action icon in the triggered state based on the preset game action recognition model, the followings can be further included.

S201, identifying the game skill action corresponding to the game skill icon in the triggered state. Obtaining the game screen image of the game skill icon in the triggered state, and inputting the game screen image into the trained character skill recognition model, so as to obtain the skill action corresponding to the game skill icon in the triggered state.

S203, classifying the game skill action, and determining the game skill type corresponding to the game skill action, the game skill type including one or more of a direct trigger type, staged release type, skill release state type, storage trigger refresh type, and released state cooling type.

A game player can use keyboards or gamepads to release skill actions individually or in combination with the corresponding keys of the selected game character's Q skill, W skill, E skill, R skill, D skill or F skill, thus producing different types of game skills, the game skill type can be direct trigger type, staged release type, skill release state type, storage trigger refresh type, or released state cooling type, etc. When the game player triggers different game skill types, the release time of the skill action corresponding to the game skill type and the corresponding color change are different.

S205, based on the preset priority of the game skill type, displaying the game lighting-effects corresponding to the game skill type, superimposing the game lighting-effects with low priority on the game lighting-effects with high priority, or the low-level game lighting-effects and high-priority game lighting-effects are mixed and displayed.

The preset priority can be determined according to the trigger time of the skill action corresponding to the game skill type. The earlier the trigger time of the skill action is, the higher its corresponding priority is, and the shorter the trigger time of the skill action is. The lower the corresponding priority, the skilled in the art can determine the preset priority according to the actual use needs. Since the skill release effect duration of different game skill types is different, the game lighting-effect with low priority can be superimposed on the priority Among the high-level game lighting-effects, the game lighting-effects corresponding to all released game skill types are comprehensively displayed.

Specifically, the game player uses a keyboard or a gamepad to perform a combined skill release action on the corresponding keys of the selected game character's Q skill, W skill, E skill, R skill, D skill or F skill, thereby generating different game skill types such as the skill release state type, staged release type, and direct trigger type, etc. The game lighting-effects corresponding to the game skill types are displayed successively according to the trigger time of the skill release state type, staged release type, and direct trigger type. For example, the trigger time of the skill release state type is earlier than the staged release type and the direct trigger type, and the trigger time of the staged release type is earlier than the direct trigger type. That is, it gives priority to displaying the game lighting-effect corresponding to the skill release state type. If the game lighting-effect corresponding to the skill release state type has not ended when the skill action corresponding to the staged release type or the direct trigger type is released, the game lighting-effect corresponding to the staged release type or the direct trigger type is superimposed in the game lighting-effect corresponding to the skill release state type. It is not difficult to understand that, if the priority of displaying the game lighting-effect corresponding to the game skill type is low, but the game lighting-effect to be displayed is relatively rich, it can directly cover the unfinished game lighting-effect of the game skills corresponding to the game skill type with higher priority.

As it can be seen from the above-mentioned embodiments, based on the preset priority of the game skill types, the game lighting-effect corresponding to the game skill type is displayed, and the game lighting-effect with a low priority is superimposed on the game lighting-effect with a high priority. The lighting effect can be adjusted promptly based on the real-time changes of the release of the game skill action corresponding to the game skill type, and the lighting effect can be adaptively matched with the user's real-time game skill action, which greatly enriches the user's e-sports visual senses, thereby enhancing the user's gaming experience.

Figure 6:
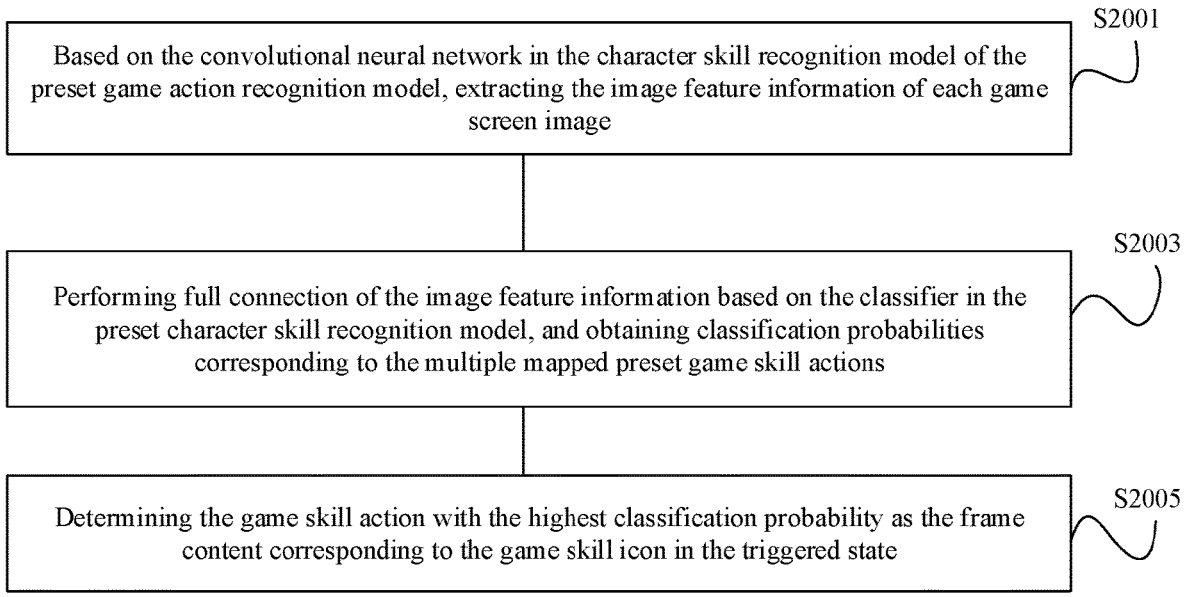
FIG. 6 illustrates a schematic flowchart diagram of identifying the frame content corresponding to the game skill icon in the triggered state based on a preset character skill recognition model according to an embodiment of the present disclosure.

On the basis of above embodiments of the present disclosure, referring to FIG. 6, the process of identifying the frame content corresponding to the game action icon in the triggered state based on the preset game action recognition model may include the following.

S2001, based on the convolutional neural network in the character skill recognition model of the preset game action recognition model, extracting the image feature information of each game screen image.

The character skill recognition model of the preset game action recognition model is used to perform game character skill action recognition on each image frame. The convolutional network in the model usually includes multiple convolutional layers, and each convolutional layer contains multiple convolutional kernels (also known as filters). Each convolution kernel corresponds to a different weight, used to extract different image features. These convolution kernels scan the entire image frame from left to right, and from top to bottom, to extract the corresponding image feature information. In this process, the shallow layer in the convolutional network, that is, the previous convolution layer, extracts the shallow image features corresponding to the image frame, including local and detailed information, such as the color, texture, edge, and contour, etc., information of the image frame. It has a small receptive field layer by layer, that is, each pixel of the output feature map only uses a small range of the input image frame. After that, the receptive field layer by layer of the subsequent convolutional layer is enlarged as the deep layer, to extract the deep image features corresponding to the image frame, including more complex and abstract information. Accordingly, after all convolutional layer operations, the shallow image features and deep image features are fused to obtain each abstract representation of different scales of the image frame, i.e., the image feature information.

S2003, performing full connection of the image feature information based on the classifier in the preset character skill recognition model, and obtaining classification probabilities corresponding to the multiple mapped preset game skill actions.

The classifier can be MLP (Multilayer Perceptron), which includes an input layer, a hidden layer, and an output layer. The specific number of layers of the hidden layer can be flexibly set by those skilled in the art. The layers in the MLP are fully connected. The input layer receives the image feature information and inputs the image feature information to the hidden layer and, through the corresponding activation function of the hidden layer, the image feature information is classified and mapped to the preset binary classification space. Through the activation function of the output layer, the output of the last layer of the hidden layer is normalized, and the classification probabilities corresponding to the first class space and the second class space mapped to the binary classification space are calculated. The first class space represents a binary value "1", and the second class space represents the binary value "0". The activation function can be flexibly set by those skilled in the art. The activation function corresponding to the hidden layer can be a ReLU (Rectified Linear Unit) function, etc., and the activation function of the output layer can be a Softmax function or a Sigmord function, etc.

S2005, determining the game skill action with the highest classification probability as the frame content corresponding to the game skill icon in the triggered state.

It is judged whether the maximum classification probability exceeds a preset threshold and, when it exceeds the preset threshold, it can determine the game skill action with the maximum classification probability as the action recognition result of the current image frame, and determine the game skill action with the largest classification probability as the frame content corresponding to the game skill icon in the triggered state.

Figure 7:
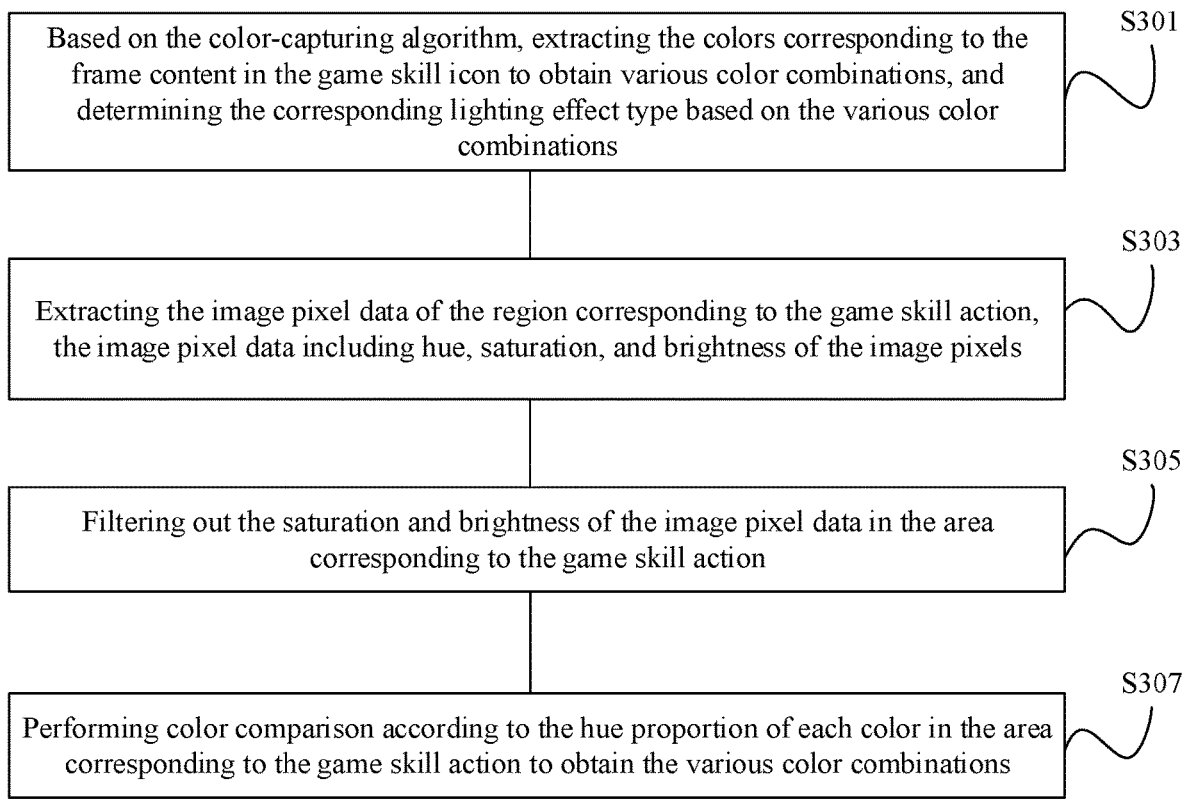
FIG. 7 illustrates a schematic flowchart diagram of extracting colors corresponding to the frame content of the game skill icon based on the color-capturing algorithm to obtain various color combinations so as to obtain various types of lighting effects according to an embodiment of the present disclosure.

On the basis of the embodiments of the present disclosure, referring to FIG. 7, after determining the corresponding lighting effect type based on the recognition result of the frame content corresponding to the game action icon, the followings may be included.

S301, based on the color-capturing algorithm, extracting the colors corresponding to the frame content in the game skill icon to obtain various color combinations, and determining the corresponding lighting effect type based on the various color combinations.

S303, extracting the image pixel data of the region corresponding to the game skill action, the image pixel data including hue, saturation, and brightness of the image pixels.

After the game skill icon of the selected game character is triggered, the color rendered by the game skill action and skill type corresponding to the game skill icon change accordingly, and the color change of the game skill icon during triggering has significantly game character characteristics. The image pixel data of the frame content corresponding to the game skill icon is extracted, that is, extracting the image pixel data of the colors rendered by the game skill action and skill type corresponding to the game skill icon, the image pixel data can include hue, saturation, and brightness, etc.

S305, filtering out the saturation and brightness of the image pixel data in the region corresponding to the game skill action.

The saturation and brightness in the image pixel data of the color rendered by the skill action and the skill type corresponding to the game skill icon are filtered to determine the color blocks with a relatively large hue proportion in the image pixel data.

S307, performing color comparison according to the hue proportion of each color in the region corresponding to the game skill action to obtain the various color combinations.

According to the hue proportion of each color in the corresponding area of the game skill action, the corresponding HSV value of each color block is outputted, and the HSV value includes hue, saturation, and brightness, etc., and the corresponding color blocks are compared in color. Based on the result of the color comparison, the HSV values of the corresponding color blocks are combined to obtain the various color combinations, and the corresponding lighting effect types are determined based on the various color combinations.

As it can be known from the above embodiments, the corresponding lighting effect type is determined in real time according to the color change of the game skill icon in the triggering process, and the game lighting-effect corresponding to the game skill icon is presented, so that the game lighting-effect is displayed matching the content of the game screen image, which make the game lighting-effect adapt to the game state in real time, so as to create a better game atmosphere and enhance the user's game experience.

Figure 8:
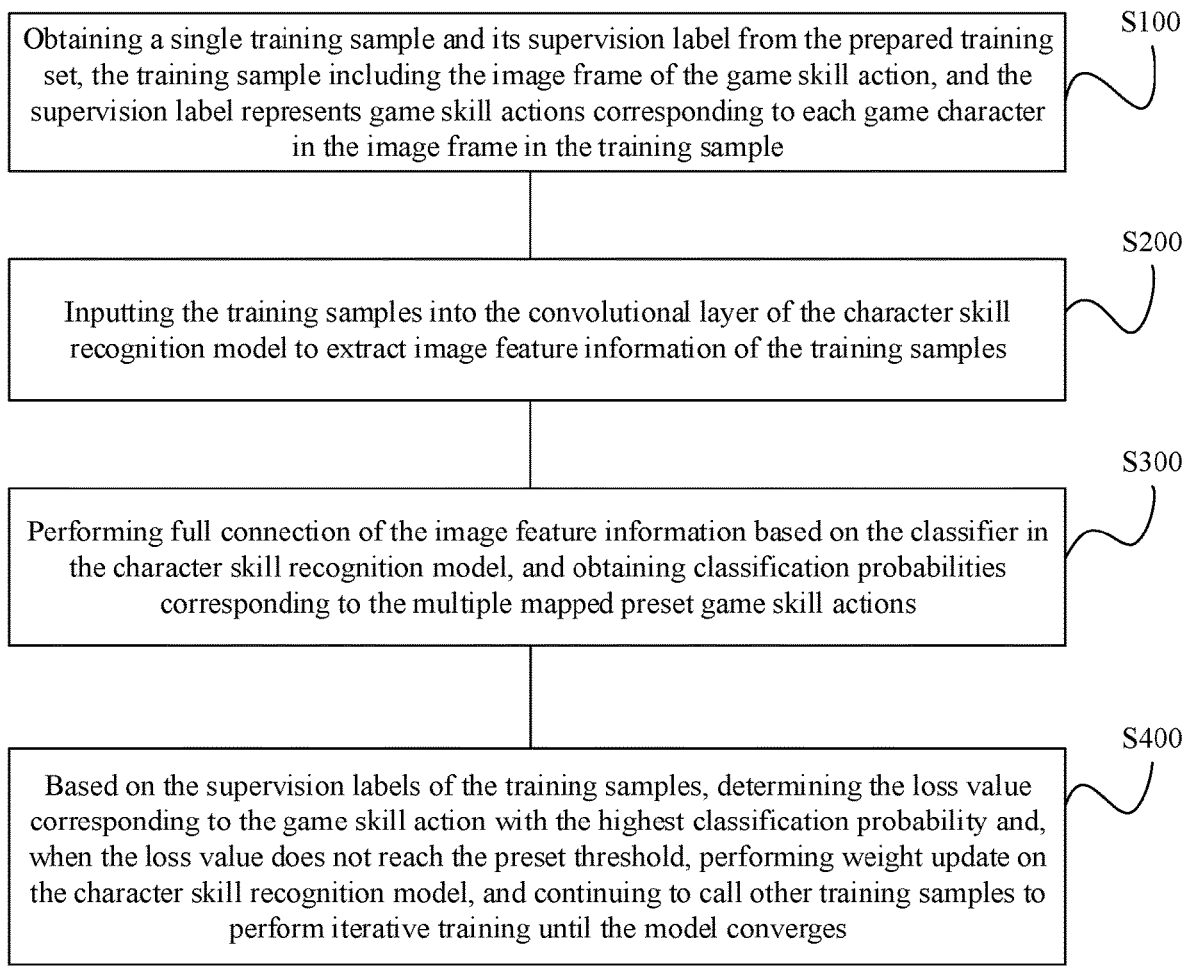
FIG. 8 illustrates a schematic flowchart diagram of a training process of the character skill recognition model according to an embodiment of the present disclosure.

On the basis of the embodiments of the present disclosure, referring to FIG. 8, the training process of the character skill recognition model may include the following.

S100, obtaining a single training sample and its supervision label from the prepared training set, the training sample including the image frame of the game skill action, and the supervision label represents game skill actions corresponding to each game character in the image frame in the training sample.

When the character skill recognition model is trained, game screen images with game skill icons in the triggered state can be collected in advance as sample images, each training sample is correspondingly labeled with sample labels, and skill action corresponding to the game skill icon in the triggered state of the training sample and the skill type corresponding to the skill action are labeled. After completing the labeling of each training sample, each training sample and its supervision label can be mapped to construct a training set, and sample images in the sample data set and the sample labels are inputted. The sample label represents the skill action corresponding to the game skill icon in the triggered state and the skill type corresponding to the skill action.

S200, inputting the training samples into the convolutional layer of the character skill recognition model to extract image feature information of the training samples.

A preset character skill recognition model is used to perform skill recognition on the training samples. The convolutional network in the model usually includes multiple convolutional layers, and each convolutional layer contains multiple convolutional kernels (also known as filters). Each convolution kernel corresponds to a different weight, used to extract different image features. These convolution kernels scan the entire image frame of the training sample from left to right, and from top to bottom, to extract the corresponding image feature information. In this process, the shallow layer in the convolutional network, that is, the previous convolution layer, extracts the shallow image features corresponding to the image frame, including local and detailed information, such as the color, texture, edge, and contour, etc., information of the image frame. It has a small receptive field layer by layer, that is, each pixel of the output feature map only uses a small range of the input image frame. After that, the receptive field layer by layer of the subsequent convolutional layer is enlarged as the deep layer, to extract the deep image features corresponding to the image frame, including more complex and abstract information. Accordingly, after all convolutional layer operations, the shallow image features and deep image features are fused to obtain each abstract representation of different scales of the image frame, i.e., the image feature information.

S300, performing full connection of the image feature information based on the classifier in the character skill recognition model, and obtaining classification probabilities corresponding to the multiple mapped preset game skill actions.

The classifier can be MLP (Multilayer Perceptron), which includes an input layer, a hidden layer, and an output layer. The specific number of layers of the hidden layer can be flexibly set by those skilled in the art. The layers in the MLP are fully connected. The input layer receives the image feature information and inputs the image feature information to the hidden layer and, through the corresponding activation function of the hidden layer, the image feature information is classified and mapped to the preset binary classification space. Through the activation function of the output layer, the output of the last layer of the hidden layer is normalized, and the classification probabilities corresponding to the first class space and the second class space mapped to the binary classification space are calculated. The first class space represents a binary value "1", and the second class space represents the binary value "0". The activation function can be flexibly set by those skilled in the art. The activation function corresponding to the hidden layer can be a ReLU (Rectified Linear Unit) function, etc., and the activation function of the output layer can be a Softmax function or a Sigmord function, etc.

S400, based on the supervision labels of the training samples, determining the loss value corresponding to the game skill action with the highest classification probability and, when the loss value does not reach the preset threshold, performing weight update on the character skill recognition model, and continuing to call other training samples to perform iterative training until the model converges.

Specifically, the process can include: calling the preset cross-entropy loss function to, according to the supervision label of the training sample, calculate the cross-entropy loss value corresponding to the game skill action with the highest classification probability and the corresponding the skill type. When the loss value reaches the preset, it indicates that the model has reached the convergence state. When the loss value does not reach the preset threshold, it indicates that the model has not reached the convergence state, and the model can be updated according to the gradient of each loss value, usually by correcting the weight parameters of each link of the model through backpropagation to make the model further approach convergence. Further, it continues to call the next training sample in the training set to perform iterative training on the model until the character skill recognition model is trained to a converged state.

Accordingly, the training process of the character skill recognition model is described. After being training to convergence, the character skill recognition model learns the ability to, according to the image feature information of each game screen image, accurately determine the classification probability corresponding to the preset multiple game skill actions and corresponding skill types.

Figure 9:
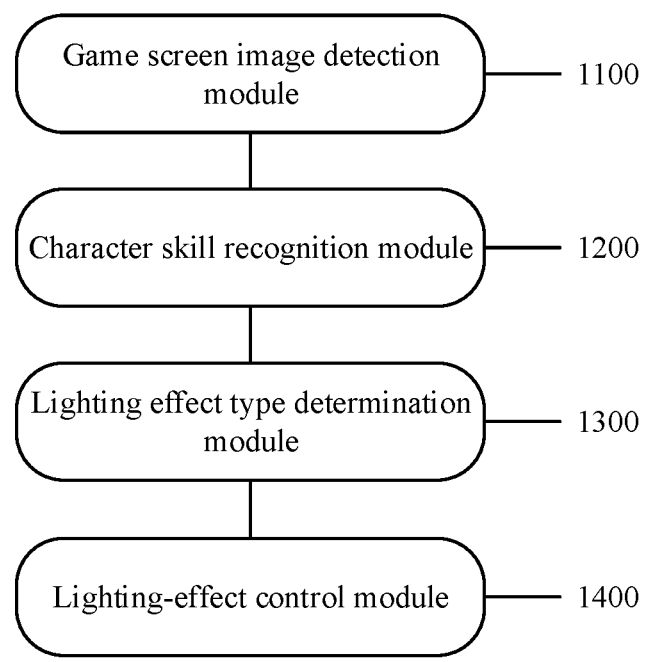
FIG. 9 illustrates a schematic diagram of a game lighting-effect control device according to an embodiment of the present disclosure.

Referring to FIG. 9, a game lighting-effect control device is provided according to an aspect of the present disclosure. The lighting-effect control device includes a game screen image detection module 1100, a character skill recognition module 1200, a lighting effect type determination module 1300, and a lighting-effect control module 1400. The game screen image detection module 1100 is configured to obtain each game screen image presented in a continuous timing sequence, and performing target detection on the game action icons in each game screen image to determine that the game-action icon is in a triggered state. The character action recognition module 1200 is configured to, based on a preset game-action recognition model, identify the frame content corresponding to the game action icon in the triggered state, and the frame content represents the game-action corresponding to each game character.

The lighting effect type determination module 1300 is configured to determine the corresponding lighting effect type based on the recognition result of the frame content corresponding to the game action icon. The lighting-effect control module 1400 is configured to generate a corresponding lighting-effect control instruction based on the lighting effect type, and input the lighting-effect control instruction to the lighting-effect control circuit in the lighting device to display the game lighting-effect corresponding to the lighting effect type.

On the basis of the embodiment of the present disclosure, the game screen image detection module 1100 includes: a target detection unit, a trigger state detection unit, and a frame position determination unit. The target detection unit is configured to detect that the game skill icon corresponding to each game screen image is in a triggered state, the game action icon including an icon representing a game skill. The trigger state detection unit is configured to detect whether the frame content corresponding to the game skill icon in each game screen image has changed. If it is detected that there is an image difference between the frame content and the original frame content corresponding to the game skill icon information, it can determine that the game skill icon is in a triggered state based on the image difference information. The frame position determination unit is configured to, based on the game skill icon in the triggered state, determine the frame position corresponding to the game skill icon.

On the basis of the embodiments of the present disclosure, the game screen image detection module 1100 further includes: a cooling state determination unit, configured to, when it is detected that the frame content is the same as the original frame content corresponding to the game skill icon, determine that the game skill icon is in an initial or cooling state. The steps after performing target detection on the game skill icons in each game screen image are no longer performed.

On the basis of the embodiments of the present disclosure, the game lighting-effect control device further includes: a game skill identification unit, a game skill classification unit, and a lighting effect superposition unit. The game skill identification unit is configured to identify the game skill action corresponding to the game skill icon in the triggered state. The game skill classification unit is configured to classify the game skill action, and determine the game skill type corresponding to the game skill action, the game skill type including one or more of a direct trigger type, staged release type, skill release state type, storage trigger refresh type, and released state cooling type. The lighting effect superposition unit is configured to, based on the preset priority of the game skill type, display the game lighting-effects corresponding to the game skill type, and superimpose the game lighting-effects with low priority on the game lighting-effects with high priority.

On the basis of the embodiments of the present disclosure, the character action recognition module 1200 includes: a feature extraction unit, a classifier unit, and a determining unit. The feature extraction unit is configured to, based on the convolutional neural network in the character skill recognition model of the preset game action recognition model, extracting the image feature information of each game screen image. The classifier unit is configured to perform full connection of the image feature information based on the classifier in the preset character skill recognition model, and obtain classification probabilities corresponding to the multiple mapped preset game skill actions. The determining unit is configured to determine the game skill action with the highest classification probability as the frame content corresponding to the game skill icon in the triggered state.

On the basis of the embodiments of the present disclosure, the lighting effect type determining module 1300 includes: a determining unit, a picture pixel extraction unit, a filtering unit, and a color combination unit. The determining unit configured to, based on the color-capturing algorithm, extracting the colors corresponding to the frame content in the game skill icon to obtain various color combinations, and determining the corresponding lighting effect type based on the various color combinations. The picture pixel extraction unit is configured to extract the image pixel data of the region corresponding to the game skill action, the image pixel data including hue, saturation, and brightness of the image pixels. The filtering unit is configured to filter out the saturation and brightness of the image pixel data in the area corresponding to the game skill action. The color combination unit is configured to perform color comparison according to the hue proportion of each color in the area corresponding to the game skill action to obtain the various color combinations.

On the basis of the embodiments of the present disclosure, the character skill recognition model includes an acquisition unit, an image feature extraction unit, a classification probability determination unit, and a weight update unit. The acquisition unit configured to acquire a single training sample and its supervision label from the prepared training set, the training sample including the image frame of the game skill action, and the supervision label represents game skill actions corresponding to each game character in the image frame in the training sample. The image feature extraction unit is configured to input the training samples into the convolutional layer of the character skill recognition model to extract image feature information of the training samples. The classification probability determination unit is configured to perform full connection of the image feature information based on the classifier in the character skill recognition model, and obtain classification probabilities corresponding to the multiple mapped preset game skill actions. The weight update unit is configured to, based on the supervision labels of the training samples, determine the loss value corresponding to the game skill action with the highest classification probability and, when the loss value does not reach the preset threshold, performing weight update on the character skill recognition model, and continue to call other training samples to perform iterative training until the model converges.

The present disclosure also provides a storage medium storing computer-readable instructions. When the computer-readable instructions are executed by one or more processors, the one or more processors execute or perform the game lighting-effect control method described in any embodiment of the present disclosure.

The present disclosure also provides a computer program product, including computer programs/instructions. When the computer programs/instructions are executed by one or more processors, the game lighting-effect control method described in any embodiment of the present disclosure is implemented.

Those of ordinary skill in the art can understand that all or part of the processes in the above-mentioned methods in the embodiments of the present disclosure can be realized by instructing related hardware through a computer program, and the computer program can be stored in a computer-readable storage medium. When the program is executed, it can realize the processes of the embodiments of the above-mentioned methods. The aforementioned non-transitory storage medium may be a computer-readable storage medium such as a magnetic disk, an optical disk, a read-only memory (ROM), or a random access memory (RAM), etc.

Accordingly, various color combinations are determined according to the game skill actions and game skill types corresponding to the game skill icons, and the corresponding lighting effects are determined based on the various color combinations corresponding to the specific game skill actions of various game characters in the game, which greatly enriches the control and display of lighting effects, adjusts the lighting effects promptly according to the real-time changes of game skill actions, and adaptively matches the lighting effects with the user's real-time game skill actions, bringing users a unique interactive experience of game lighting-effects, and greatly improving the user's e-sports visual senses, thereby enhancing the user's gaming experience.

Those skilled in the art can understand that the various operations, methods, and steps, measures, and schemes in the processes that have been discussed in this disclosure can be replaced, changed, combined, or deleted. Furthermore, the various operations, methods, and other steps, measures, and schemes in the process that have been discussed in this disclosure can also be replaced, changed, rearranged, decomposed, combined, or deleted. Further, steps, measures, and schemes in the prior art that have operations, methods, and processes disclosed in the present disclosure may also be alternated, changed, rearranged, decomposed, combined, or deleted.

Finally, it should be noted that: the above embodiments are only used to illustrate the technical solutions of the present disclosure, but not to limit the present disclosure. Although the present disclosure has been described in detail with reference to the foregoing embodiments, those of ordinary skill in the art should understand that modifications can be made to the technical solutions described in the foregoing embodiments, or equivalent replacements are made to some of the technical features; and these modifications or replacements do not drive the essence of the corresponding technical solutions away from the spirit and scope of the technical solutions of the various embodiments of the present disclosure.

What is claimed is:

1. A game lighting-effect control method, comprising:
    acquiring each game screen image presented in a continuous timing sequence, and performing target detection on game action icons in each game screen image to determine that a game-action icon is in a triggered state, wherein the game action icons include game skill icons, the game skill icons have frame content, the frame content is different for different game characters and presents different colors corresponding to different skill actions of a selected game character, and the skill actions are released individually or in combination through a button;
    identifying the frame content corresponding to the game action icon in the triggered state based on a preset game-action recognition model, the frame content representing game actions corresponding to each game character;
    determining a corresponding lighting effect type based on a color-change recognition result of the frame content corresponding to the game action icon; and
    generating a corresponding lighting-effect control instruction based on the lighting effect type, and inputting the lighting-effect control instruction to a lighting-effect control circuit in a lighting device to display a game lighting-effect corresponding to the lighting effect type.

2. The game lighting-effect control method according to claim 1, wherein the performing target detection on the game action icons in each game screen image to determine that a game-action icon is in a triggered state further comprises:
    detecting whether any game skill icon corresponding to each game screen image is in a triggered state based on a preset target detection model, the game action icon including an icon representing a game skill;
    detecting whether the frame content corresponding to any game skill icon in each game screen image has changed from its original frame content and determining, when it is detected that there is an image difference between the frame content and the original frame content corresponding to a game skill icon, that the game skill icon is in a triggered state based on the image difference; and
    based on the game skill icon in the triggered state, determining a frame position corresponding to the game skill icon.

3. The game lighting-effect control method according to claim 2, wherein, after detecting whether the frame content corresponding to any game skill icon in each game screen image has changed, the method further comprises:
    when it is detected that the frame content is the same as the original frame content corresponding to the game skill icon, determining that the game skill icon is in an initial or cooling state; and
    stopping performing any step after performing target detection on the game skill icons in the respective game screen images.

4. The game lighting-effect control method according to claim 2, wherein, after detecting whether any game skill icon corresponding to each game screen image is in a triggered state based on a preset target detection model, the method further comprises:
    identifying a game skill action corresponding to the game skill icon in the triggered state,
    classifying the game skill action, and determining a game skill type corresponding to the game skill action, the game skill type including one or more of a direct trigger type, a staged release type, a skill release state type, a storage trigger refresh type, and a released state cooling type; and
    based on a preset priority of the game skill type, displaying game lighting-effects corresponding to the game skill type, superimposing game lighting-effects with low priority on game lighting-effects with high priority, or mixing and displaying the game lighting-effects with low priority and the game lighting-effects with high priority.

5. The game lighting-effect control method according to claim 2, wherein the identifying the frame content corresponding to the game action icon in the triggered state based on a preset game-action recognition model further comprises:
   based on a convolutional neural network in a character skill recognition model of the preset game-action recognition model, extracting image feature information of each game screen image;
   performing full connection of the image feature information based on a classifier in the character skill recognition model, and obtaining corresponding classification probabilities mapped to multiple preset game skill actions; and
   determining a game skill action with the highest classification probability as the frame content corresponding to the game skill icon in the triggered state.

6. The game lighting-effect control method according to claim 5, wherein a training process of the character skill recognition model comprises:
   obtaining a single training sample and its supervision labels from a prepared training set, the training sample including an image frame of the game skill action, and the supervision labels represent game skill actions corresponding to each game character in the image frame in the training sample;
   inputting the training sample into a convolutional layer of the character skill recognition model to extract image feature information of the training sample;
   performing full connection of the image feature information based on the classifier in the character skill recognition model, and obtaining corresponding classification probabilities mapped to multiple preset game skill actions; and
   based on the supervision labels of the training sample, determining a loss value corresponding to the game skill action with the highest classification probability and, when the loss value does not reach a preset threshold, performing weight update on the character skill recognition model, and continuing to call other training samples to perform iterative training until the model converges.

7. The game lighting-effect control method according to claim 4, wherein the determining a corresponding lighting effect type based on a color-change recognition result of the frame content corresponding to the game action icon further comprises:
   based on a color-capturing algorithm, extracting colors corresponding to the frame content in the game skill icon to obtain various color combinations, and determining a corresponding lighting effect type based on the various color combinations;
   extracting image pixel data of a region corresponding to the game skill action, the image pixel data including hue, saturation, and brightness;
   filtering out the saturation and brightness of the image pixel data in the region corresponding to the game skill action; and
   performing color comparison according to a hue proportion of each color in the region corresponding to the game skill action to obtain the various color combinations.

8. A game lighting-effect control device, comprising:
   a control unit, and a lighting device, wherein the lighting device has a built-in lighting-effect control circuit, and the control unit is used to run a computer program product and, when the computer program product is running, execute a game lighting-effect control method comprising:
   acquiring each game screen image presented in a continuous timing sequence, and performing target detection on game action icons in each game screen image to determine that a game-action icon is in a triggered state, wherein the game action icons include game skill icons, the game skill icons have frame content, the frame content is different for different game characters and presents different colors corresponding to different skill actions of a selected game character, and the skill actions are released individually or in combination through a button;
   identifying the frame content corresponding to the game action icon in the triggered state based on a preset game-action recognition model, the frame content representing game actions corresponding to each game character;
   determining a corresponding lighting effect type based on a color-change recognition result of the frame content corresponding to the game action icon; and
   generating a corresponding lighting-effect control instruction based on the lighting effect type, and inputting the lighting-effect control instruction to a lighting-effect control circuit in a lighting device to display a game lighting-effect corresponding to the lighting effect type.

9. The game lighting-effect control device according to claim 8, wherein the performing target detection on the game action icons in each game screen image to determine that a game-action icon is in a triggered state further comprises:
   detecting whether any game skill icon corresponding to each game screen image is in a triggered state based on a preset target detection model, the game action icon including an icon representing a game skill;
   detecting whether the frame content corresponding to any game skill icon in each game screen image has changed from its original frame content and determining, when it is detected that there is an image difference between the frame content and the original frame content corresponding to a game skill icon, that the game skill icon is in a triggered state based on the image difference; and
   based on the game skill icon in the triggered state, determining a frame position corresponding to the game skill icon.

10. The game lighting-effect control device according to claim 9, wherein, after detecting whether the frame content corresponding to any game skill icon in each game screen image has changed, the method further comprises:
   when it is detected that the frame content is the same as the original frame content corresponding to the game skill icon, determining that the game skill icon is in an initial or cooling state; and
   stopping performing any step after performing target detection on the game skill icons in the respective game screen images.

11. The game lighting-effect control device according to claim 9, wherein, after detecting whether any game skill icon corresponding to each game screen image is in a triggered state based on a preset target detection model, the method further comprises:
   identifying a game skill action corresponding to the game skill icon in the triggered state, classifying the game skill action, and determining a game skill type corresponding to the game skill action, the game skill type including one or more of a direct trigger type, a staged release type, a skill release state type, a storage trigger refresh type, and a released state cooling type;

based on a preset priority of the game skill type, displaying game lighting-effects corresponding to the game skill type, superimposing game lighting-effects with low priority on game lighting-effects with high priority, or mixing and displaying the game lighting-effects with low priority and the game lighting-effects with high priority.

12. The game lighting-effect control device according to claim 11, wherein the determining a corresponding lighting effect type based on a color-change recognition result of the frame content corresponding to the game action icon further comprises:

based on a color-capturing algorithm, extracting colors corresponding to the frame content in the game skill icon to obtain various color combinations, and determining a corresponding lighting effect type based on the various color combinations;

extracting image pixel data of a region corresponding to the game skill action, the image pixel data including hue, saturation, and brightness;

filtering out the saturation and brightness of the image pixel data in the region corresponding to the game skill action; and performing color comparison according to a hue proportion of each color in the region corresponding to the game skill action to obtain the various color combinations.

13. The game lighting-effect control device according to claim 9, wherein the identifying the frame content corresponding to the game action icon in the triggered state based on a preset game-action recognition model further comprises:

based on a convolutional neural network in a character skill recognition model of the preset game-action recognition model, extracting image feature information of each game screen image;

performing full connection of the image feature information based on a classifier in the character skill recognition model, and obtaining corresponding classification probabilities mapped to multiple preset game skill actions; and determining a game skill action with the highest classification probability as the frame content corresponding to the game skill icon in the triggered state.

14. The game lighting-effect control device according to claim 13, wherein a training process of the character skill recognition model comprises:

obtaining a single training sample and its supervision labels from a prepared training set, the training sample including an image frame of the game skill action, and the supervision labels represent game skill actions corresponding to each game character in the image frame in the training sample;

inputting the training sample into a convolutional layer of the character skill recognition model to extract image feature information of the training sample;

performing full connection of the image feature information based on the classifier in the character skill recognition model, and obtaining corresponding classification probabilities mapped to multiple preset game skill actions; and based on the supervision labels of the training sample, determining a loss value corresponding to the game skill action with the highest classification probability and, when the loss value does not reach a preset threshold, performing weight update on the character skill recognition model, and continuing to call other training samples to perform iterative training until the model converges.

15. A non-transitory computer-readable storage medium storing a computer program in the form of computer-readable instructions for, when the computer program is run by a computer, performing a game lighting-effect control method comprising:

acquiring each game screen image presented in a continuous timing sequence, and performing target detection on game action icons in each game screen image to determine that a game-action icon is in a triggered state, wherein the game action icons include game skill icons, the game skill icons have frame content, the frame content is different for different game characters and presents different colors corresponding to different skill actions of a selected game character, and the skill actions are released individually or in combination through a button;

identifying the frame content corresponding to the game action icon in the triggered state based on a preset game-action recognition model, the frame content representing game actions corresponding to each game character;

determining a corresponding lighting effect type based on a color-change recognition result of the frame content corresponding to the game action icon; and generating a corresponding lighting-effect control instruction based on the lighting effect type, and inputting the lighting-effect control instruction to a lighting-effect control circuit in a lighting device to display a game lighting-effect corresponding to the lighting effect type.

16. The non-transitory computer-readable storage medium according to claim 15, wherein the performing target detection on the game action icons in each game screen image to determine that a game-action icon is in a triggered state further comprises:

detecting whether any game skill icon corresponding to each game screen image is in a triggered state based on a preset target detection model, the game action icon including an icon representing a game skill;

detecting whether the frame content corresponding to any game skill icon in each game screen image has changed from its original frame content and determining, when it is detected that there is an image difference between the frame content and the original frame content corresponding to a game skill icon, that the game skill icon is in a triggered state based on the image difference; and based on the game skill icon in the triggered state, determining a frame position corresponding to the game skill icon.

17. The non-transitory computer-readable storage medium according to claim 16, wherein, after detecting whether the frame content corresponding to any game skill icon in each game screen image has changed, the method further comprises:

when it is detected that the frame content is the same as the original frame content corresponding to the game skill icon, determining that the game skill icon is in an initial or cooling state; and stopping performing any step after performing target detection on the game skill icons in the respective game screen images.

18. The non-transitory computer-readable storage medium according to claim 16, wherein, after detecting whether any game skill icon corresponding to each game screen image is in a triggered state based on a preset target detection model, the method further comprises:
- identifying a game skill action corresponding to the game skill icon in the triggered state,
- classifying the game skill action, and determining a game skill type corresponding to the game skill action, the game skill type including one or more of a direct trigger type, a staged release type, a skill release state type, a storage trigger refresh type, and a released state cooling type;
- based on a preset priority of the game skill type, displaying game lighting-effects corresponding to the game skill type, superimposing game lighting-effects with low priority on game lighting-effects with high priority, or mixing and displaying the game lighting-effects with low priority and the game lighting-effects with high priority.

19. The non-transitory computer-readable storage medium according to claim 16, wherein the identifying the frame content corresponding to the game action icon in the triggered state based on a preset game-action recognition model further comprises:
- based on a convolutional neural network in a character skill recognition model of the preset game-action recognition model, extracting image feature information of each game screen image;
- performing full connection of the image feature information based on a classifier in the character skill recognition model, and obtaining corresponding classification probabilities mapped to multiple preset game skill actions; and
- determining a game skill action with the highest classification probability as the frame content corresponding to the game skill icon in the triggered state.

* * * * *